United States Patent
Yoen et al.

(10) Patent No.: US 11,499,579 B2
(45) Date of Patent: Nov. 15, 2022

(54) STRUCTURE FOR FASTENING VEHICLE COMPONENTS WITH STEPS ADJUSTABLE

(71) Applicants: Hyundai Motor Company, Seoul (KR); Kia Motors Corporation, Seoul (KR)

(72) Inventors: Hong Soek Yoen, Incheon (KR); Jai Hak Kim, Gunpo-si (KR); Won Gun Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 140 days.

(21) Appl. No.: 17/015,565

(22) Filed: Sep. 9, 2020

(65) Prior Publication Data

US 2021/0180628 A1 Jun. 17, 2021

(30) Foreign Application Priority Data

Dec. 16, 2019 (KR) .......................... 10-2019-0168062

(51) Int. Cl.
| | |
|---|---|
| *F16B 37/08* | (2006.01) |
| *F16B 5/02* | (2006.01) |
| *F16B 37/06* | (2006.01) |
| *F16B 33/00* | (2006.01) |

(52) U.S. Cl.
CPC .............. *F16B 5/02* (2013.01); *F16B 37/061* (2013.01); *F16B 33/002* (2013.01); *F16B 37/0842* (2013.01)

(58) Field of Classification Search
CPC ........ F16B 5/02; F16B 37/061; F16B 33/002; F16B 37/0842; F16B 33/006; F16B 5/0233; F16B 39/282; F16B 5/0225; F16B 37/041; F16B 39/24; B62D 25/20; B62D 27/065
See application file for complete search history.

(56) References Cited

U.S. PATENT DOCUMENTS

| | | | |
|---|---|---|---|
| 8,202,033 B2* | 6/2012 | Choi | B62D 27/065 411/546 |
| 9,359,012 B2* | 6/2016 | Yao | F16B 5/0233 |
| 9,464,659 B2* | 10/2016 | Schwarzbich | F16B 39/24 |
| 2017/0066313 A1* | 3/2017 | Shirai | B60L 50/66 |

FOREIGN PATENT DOCUMENTS

KR 20190005394 A 1/2019

* cited by examiner

*Primary Examiner* — Lee A Holly
(74) *Attorney, Agent, or Firm* — Slater Matsil, LLP

(57) ABSTRACT

A structure for fastening vehicle components with adjustable steps includes a weld nut configured to be fixed to a vehicle floor panel, an inner bolt positioned above and fixedly inserted into the weld nut, and an assembly bolt inserted through the inner bolt and fastened to one end of the weld nut, wherein the inner bolt is configured to move in a height direction for step adjustment.

17 Claims, 4 Drawing Sheets

STRUCTURE FOR FASTENING VEHICLE COMPONENTS WITH STEPS ADJUSTABLE

CROSS-REFERENCE TO RELATED APPLICATIONS

This application claims under 35 U.S.C. § 119(a) the benefit of priority to Korean Patent Application No. 10-2019-0168062 filed on Dec. 16, 2019, the entire contents of which are incorporated herein by reference.

TECHNICAL FIELD

The present disclosure relates to a structure for fastening vehicle components with adjustable steps.

BACKGROUND

Generally, in the case of finished products, such as a vehicle, composed of a combination of a number of components, bolts and nuts are usually used to fasten the components.

In order to fasten a component to a vehicle body using a bolt and a nut, after the component is positioned in the state in which the nut is fixed to the rear surface of the vehicle body by welding, the bolt is fastened to the nut on the opposite side thereof. As a result, the component may be fixedly fastened to the vehicle body.

However, when the component is conventionally fastened to the vehicle body using the bolt and the nut, it may not cope with the situation where a gap must be provided between the vehicle body and the component in order to adjust the precision of the vehicle body or component.

That is, when the component is fastened to the vehicle body, it is impossible to adjust the above fastening by the bolt and the nut. In particular, when the nut is welded to one side of the vehicle body, it is difficult to adjust the step or gap between the component and another component or between the component and the vehicle body.

If such step or gap adjustment is impossible, workability is deteriorated due to factors such as replacement of components and a change in body shape.

Meanwhile, if an excessive gap or step occurs in a bumper matching part due to the accumulation of allowable tolerances of a lamp and a fender during the assembly thereof, merchantable quality is deteriorated and it is difficult to finely change an angle of irradiation of light after the lamp is assembled.

The above information disclosed in this Background section is only for enhancement of understanding of the background of the disclosure and therefore it may contain information that does not form the prior art that is already known in this country to a person of ordinary skill in the art.

SUMMARY

The present disclosure relates to a structure for fastening vehicle components with adjustable steps. Particular embodiments relate to a structure for fastening vehicle components with adjustable steps, capable of improving merchantable quality by finely adjusting steps caused at the time of assembling exterior components or sensors mounted on a vehicle body.

Embodiments of the present disclosure can solve problems associated with prior art.

In one aspect, embodiments of the present disclosure provide a structure for fastening vehicle components with adjustable steps, in which an exterior component is fixed by assembling an inner bolt and an assembly bolt to a weld nut fixed to a vehicle body.

In another aspect, embodiments of the present disclosure provide a structure for fastening vehicle components with adjustable steps, in which an assembly bolt applies pressure to an inner protrusion formed on an inner bolt as the assembly bolt is inserted into the inner bolt.

Embodiments of the present disclosure are not limited to the above-mentioned embodiments, and other aspects and advantages of embodiments of the present disclosure can be understood by the following description and become apparent with reference to the described embodiments of the present disclosure. Also, it is obvious to those skilled in the art to which the present disclosure pertains that the aspects and advantages of embodiments of the present disclosure can be realized by the means as claimed and combinations thereof.

The above and other aspects can be accomplished by the provision of a structure for fastening vehicle components with adjustable steps.

In a preferred embodiment, there is provided a structure for fastening vehicle components with adjustable steps, which includes a weld nut fixed to a vehicle floor panel, an inner bolt positioned above and fixedly inserted into the weld nut, and an assembly bolt inserted through the inner bolt and fastened to one end of the weld nut, wherein the inner bolt moves in a height direction for step adjustment.

The weld nut may include a weld nut stopper exposed to an upper surface of the vehicle floor panel, and a weld nut fastening part formed at an end of the weld nut stopper.

The inner bolt may include an inner bolt stopper formed above the weld nut stopper, and an inner bolt fastening part formed at an end of the inner bolt stopper.

The inner bolt fastening part may include a through-hole into which the assembly bolt is inserted. One end of the assembly bolt inserted through the through-hole may be adjacent to the inner bolt stopper, and the other end thereof may be fastened to the weld nut.

The inner bolt fastening part may include at least two slits formed in the height direction and an inner protrusion formed at one end of the through-hole. The assembly bolt may push the inner protrusion outward while being inserted into the through-hole and the inner bolt fastening part may be expanded with respect to the slits to be compressed to the weld nut.

The weld nut fastening part may include a reverse thread formed at its upper end for insertion of the inner bolt, and a forward thread formed at its lower end for engagement with the assembly bolt.

After the other end of the assembly bolt is engaged to the forward thread, the inner bolt may move in the height direction along the reverse thread.

The inner bolt may allow for the step adjustment according to its amount of rotation.

Other aspects and preferred embodiments of the disclosure are discussed infra.

It is understood that the term "vehicle" or "vehicular" or other similar term as used herein is inclusive of motor vehicles in general such as passenger automobiles including sport utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
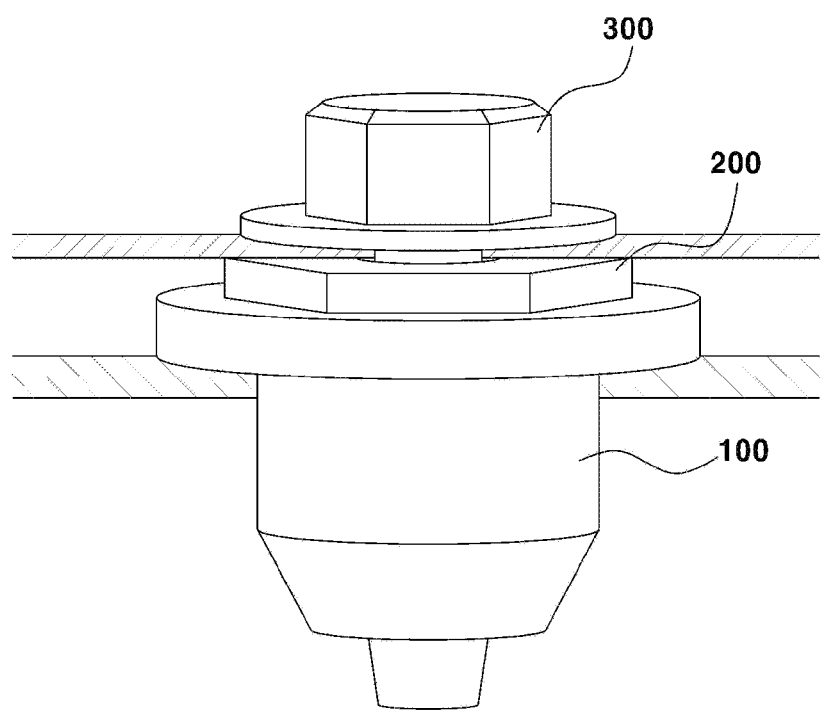
FIG. 1 is a view illustrating a structure for fastening vehicle components with adjustable steps according to an embodiment of the present disclosure.

It should be understood that the appended drawings are not necessarily to scale, presenting a somewhat simplified representation of various preferred features illustrative of the basic principles of embodiments of the disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent parts of embodiments of the present disclosure throughout the several figures of the drawing.

DETAILED DESCRIPTION OF ILLUSTRATIVE EMBODIMENTS

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

In addition, the term "part" or the like used herein refers to a unit for processing at least one function or operation, which may be implemented by hardware or software, or in combination thereof.

In addition, the terms "height direction" and/or "width direction" used herein refer to directions indicated based on a vehicle.

In addition, it will be understood that when an element is referred to as being "above" or "on" another element, it can be "immediately above" the other element or intervening elements may also be present. In contrast, it will be understood that when an element is referred to as being "beneath" or "under" another element, it can be "immediately beneath" the other element or intervening elements may also be present.

Figure 2:
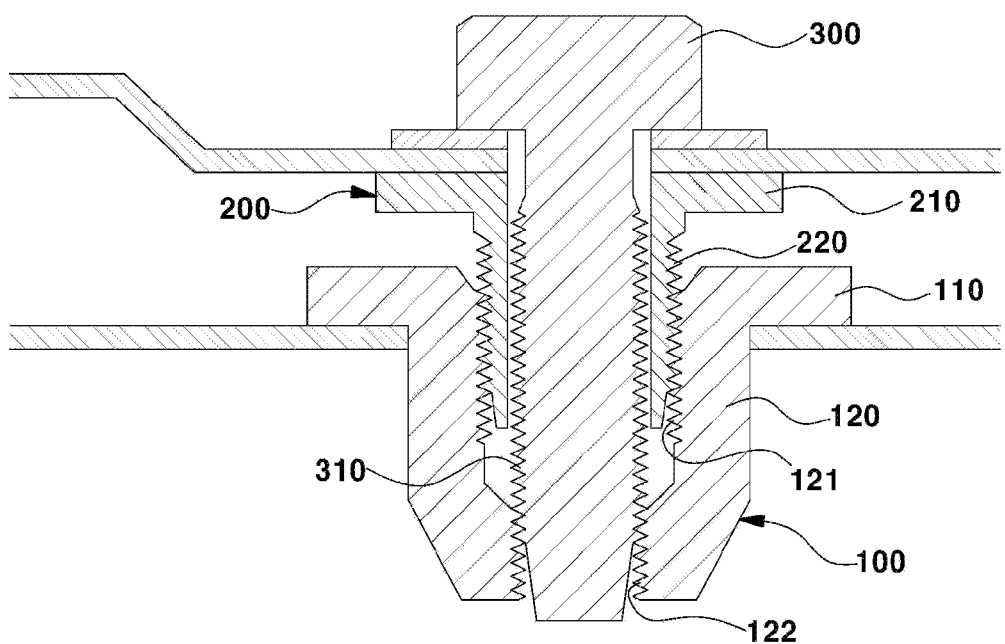
FIG. 2 is a cross-sectional view illustrating a structure for fastening vehicle components with adjustable steps according to an embodiment of the present disclosure.

FIG. 1 is a view illustrating a structure for fastening vehicle components with adjustable steps according to an embodiment of the present disclosure. FIG. 2 is a cross-sectional view illustrating a structure for fastening vehicle components with adjustable steps according to an embodiment of the present disclosure.

Referring to FIGS. 1 and 2, the structure for fastening vehicle components with adjustable steps according to an embodiment of the present disclosure includes a weld nut 100 that is fixed to a vehicle floor panel, an inner bolt 200 that is positioned above and fixedly inserted into the weld nut 100, and an assembly bolt 300 that is inserted through the inner bolt 200 and fastened to one end of the weld nut 100, wherein the inner bolt 200 moves in the height direction for step adjustment.

The weld nut 100 may be fixed to the vehicle floor panel. Preferably, the weld nut 100 serves to mount a functional component to a vehicle body, and may be inserted through a mounting part, which is formed on the vehicle floor panel, and then installed to the vehicle floor panel by welding.

The weld nut 100 may include a weld nut stopper 110 exposed to the upper surface of the vehicle floor panel and a weld nut fastening part 120 formed at the end of the weld nut stopper 110.

The weld nut stopper 110 may have a disk shape and have a hole formed for insertion of the inner bolt 200. The lower surface of the weld nut stopper 110 may be welded and attached to the upper surface of the vehicle floor panel.

The weld nut fastening part 120 may extend to an end of the weld nut stopper 110. The weld nut fastening part 120 may be located under the vehicle floor panel with the weld nut 100 fixed to the vehicle floor panel.

The inner bolt 200 may be positioned above and fixedly inserted into the weld nut 100. The inner bolt 200 may include an inner bolt stopper 210 formed above the weld nut stopper 110 and an inner bolt fastening part 220 formed at the end of the inner bolt stopper 210.

The lower surface of the inner bolt stopper 210 may be adjacent to the weld nut stopper 110 and a component to be assembled may abut on the upper surface of the inner bolt stopper 210. The inner bolt fastening part 220 may be formed at the end of the inner bolt stopper 210 and inserted into the weld nut fastening part 120.

The weld nut fastening part 120 and the inner bolt fastening part 220 may be coupled to each other by engagement of threads formed respectively thereon. The inner bolt fastening part 220 may be inserted into the weld nut fastening part 120 while rotating, to be fixed thereto.

According to an embodiment, the weld nut 100 and the inner bolt 200 may each be made of polyamide (PA) of engineering plastic materials. Preferably, the weld nut 100 and the inner bolt 200 may be made of PA66. Thus, it is possible to prevent deformation and ensure rigidity when the weld nut 100 and the inner bolt 200 are reassembled to each other.

The weld nut 100 and the inner bolt 200 may also be made of high-tech plastic, such as glass fiber reinforced plastic or carbon fiber reinforced plastic, to improve robustness even at a small size. Examples of the high-tech plastic may include, but not limited thereto, poly acetal resin (POM), polybutylene terephthalate (PBT), mPPO, and polycarbonate (PC).

The assembly bolt 300 may be inserted through the inner bolt 200 and fastened to one end of the weld nut 100. The assembly bolt 300 may be fastened to the inner bolt 200 to fix a component to the vehicle body.

In an embodiment, after the weld nut 100 and the inner bolt 200 are assembled to each other, the weld nut 100 may be fixed to the vehicle floor panel by welding and fusion. Then, the assembly bolt 300 may be fastened to the inner bolt to fix a component in the state in which the component is placed on the inner bolt 200.

After the assembly is finally completed, it may be possible to adjust the gap or step of the component, if necessary, by moving the inner bolt 200 in the height direction. Preferably, since the component abuts on the upper portion of the inner bolt 200, it is possible to finely adjust the position of the component by moving the inner bolt 200 in the height direction.

The structure for fastening vehicle components with adjustable steps according to embodiments of the present disclosure may perform step adjustment according to the amount of rotation of the inner bolt 200. The inner bolt 200 may move up and down according to the amount of rotation thereof.

The inner bolt stopper 210 may have a polygonal shape to tighten or loosen the inner bolt 200 using a tool. Thus, it is possible to easily rotate the inner bolt 200 using various tools, for example, a spanner, a monkey spanner, a box wrench, and a ratchet wrench. Preferably, since the inner bolt stopper 210 has a hexagonal shape, it is possible to adjust the step of the component using the spanner.

Figure 3:
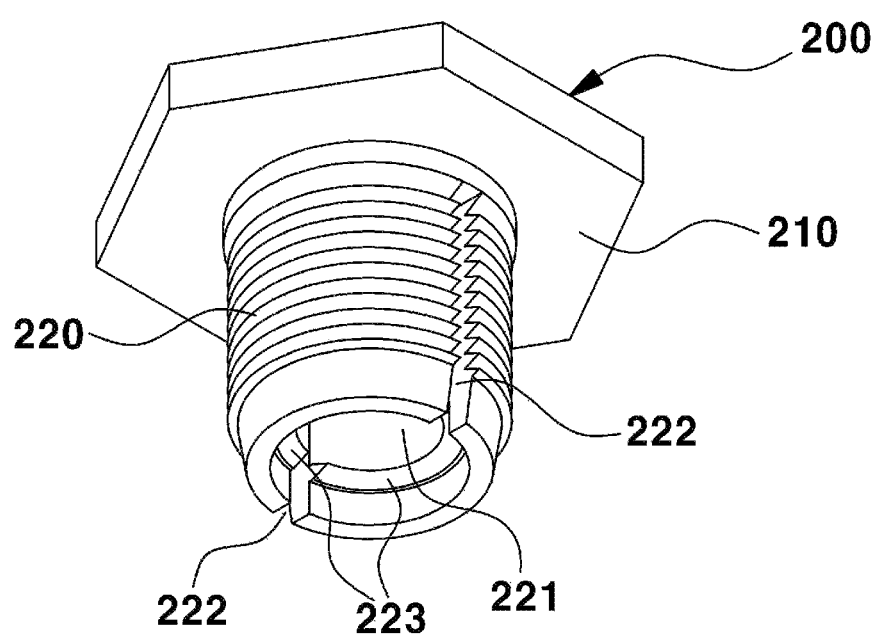
FIG. 3 is a perspective view illustrating an inner bolt in a structure for fastening vehicle components with adjustable steps according to an embodiment of the present disclosure.

FIG. 3 is a perspective view illustrating an inner bolt in a structure for fastening vehicle components with adjustable steps according to an embodiment of the present disclosure.

Referring to FIG. 3, in the structure for fastening vehicle components with adjustable steps according to an embodiment of the present disclosure, the inner bolt fastening part 220 includes a through-hole 221 into which the assembly bolt 300 is inserted. One end of the assembly bolt 300 inserted through the through-hole 221 is adjacent to the inner bolt stopper 210, and the other end thereof is fastened to the weld nut 100.

The inner bolt fastening part 220 may include at least two slits 222 formed in the height direction and an inner protrusion 223 formed at one end of the through-hole 221. The assembly bolt 300 may push the inner protrusion 223 outward while being inserted into the through-hole 221 and the inner bolt fastening part 220 may be expanded with respect to the slits 222 to be compressed to the weld nut 100.

The inner bolt fastening part 220 includes the through-hole 221 therein for insertion of the assembly bolt 300. The through-hole 221 may have no thread thereon. The assembly bolt 300 may be inserted through the through-hole 221 of the inner bolt 200. One end of the assembly bolt 300 inserted through the inner bolt 200 may be adjacent to the inner bolt stopper 210, and the other end thereof may be fastened to the weld nut 100.

After a component is placed on the inner bolt stopper 210 in the state in which the weld nut 100 and the inner bolt 200 are fastened to each other, the assembly bolt 300 may be inserted into the through-hole 221 so that one end of the assembly bolt 300 is exposed above the component.

The inner bolt fastening part 220 may include at least two slits 222 formed in the height direction. The inner protrusion 223 may be formed at one end of the through-hole 221 to prevent the inner bolt 200 from being loosened from the weld nut 100, so that the assembly bolt 300 presses the inner protrusion 223 outward while being inserted into the through-hole 221.

In the state in which the inner bolt 200 is coupled to the weld nut 100, the assembly bolt 300 may press the inner bolt 200 while being inserted into the through-hole 221. Preferably, when the assembly bolt 300 is inserted to apply pressure to the inner protrusion 223, the inner bolt fastening part 220 may be expanded with respect to the slits 222 to be compressed to the weld nut 100. In this case, when two slits 222 are formed, the inner bolt fastening part 220 may be divided into two portions compressed to the weld nut 100, and when four slits 222 are formed, the inner bolt fastening part 220 may be divided into four portions compressed to the weld nut 100.

The inner bolt fastening part 220 divided with respect to the slits 222 may have a multi-directional pressure point, and the present disclosure does not particularly limit the number of slits. In an embodiment, the inner protrusion 223 may protrude 0.25 mm in the width direction.

Thus, the weld nut 100 may be primarily coupled to the inner bolt 200 by the threads therebetween and the assembly bolt 300 may secondarily press the inner protrusion 223 to increase the fastening force therebetween, thereby preventing the inner bolt 200 from being loosened.

Figure 4:
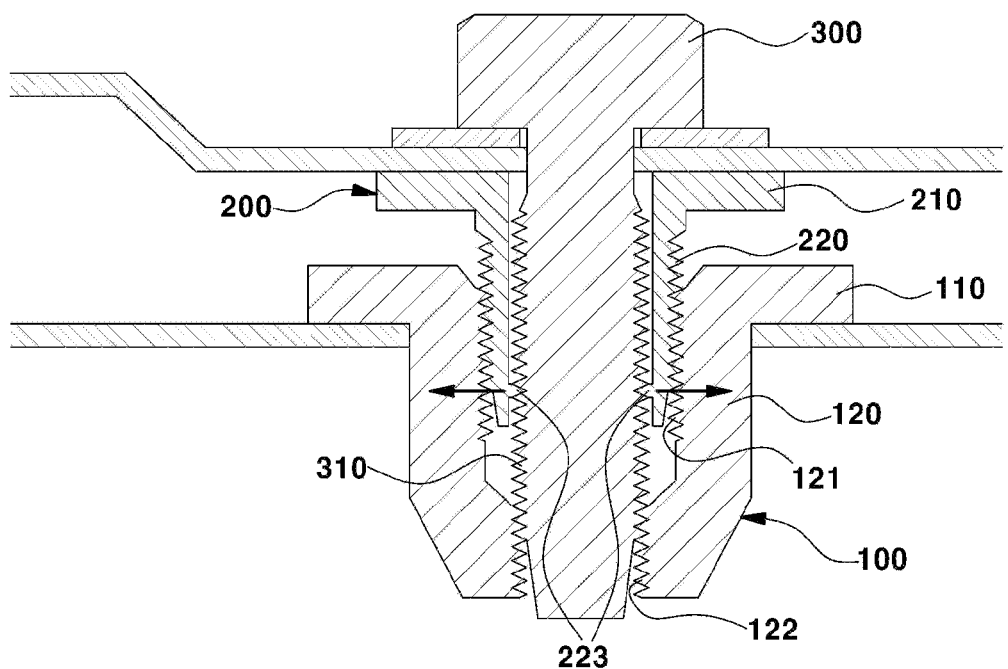
FIG. 4 is a view illustrating a state in which an assembly bolt is inserted into an inner bolt in a structure for fastening vehicle components with adjustable steps according to an embodiment of the present disclosure.

FIG. 4 is a view illustrating a state in which an assembly bolt is inserted into an inner bolt in a structure for fastening vehicle components with adjustable steps according to an embodiment of the present disclosure.

Referring to FIG. 4, in a structure for fastening vehicle components with adjustable steps according to an embodiment of the present disclosure, the weld nut fastening part 120 may include a reverse thread 121 formed at the upper end thereof for insertion of the inner bolt 200, and a forward thread 122 formed at the lower end thereof for engagement with the assembly bolt 300.

After the other end of the assembly bolt 300 is engaged to the forward thread 122, the inner bolt 200 may move in the height direction along the reverse thread 121.

The reverse thread 121 may be formed at the upper end of the weld nut fastening part 120 so that the inner bolt 200 is rotated and inserted through the reverse thread 121. The inner bolt fastening part 220 may have a thread formed on the outer periphery thereof and corresponding to the reverse thread 121, so that the weld nut 100 may be fastened to the inner bolt 200.

The weld nut fastening part 120 may have a hole formed at the lower end thereof and have an inner diameter corresponding to the outer diameter of the assembly bolt 300. The assembly bolt 300 may be fastened to the lower end of the weld nut fastening part 120 through the inner bolt 200. Preferably, the assembly bolt 300 may have an assembly bolt thread 310 formed at the other end thereof, so that the assembly bolt 300 may be fixed by engaging the assembly bolt thread 310 to the forward thread 122 of the weld nut 100.

In the structure for fastening vehicle components with steps adjustable according to an embodiment of the present disclosure, after the other end of the assembly bolt 300 is engaged to the forward thread 122, the inner bolt 200 may move in the height direction along the reverse thread 121.

Preferably, it is possible to adjust the gap or step of a component by moving the inner bolt 200 in the height direction after the assembly bolt thread 310 is fixedly engaged to the forward thread 122. When the operator rotates the inner bolt stopper 210 using a tool such as a spanner, it is possible to adjust the gap or step of a component such as a lamp abutting on the upper surface of the inner bolt 200.

In summary, according to the structure for fastening vehicle components with adjustable steps of embodiments of the present disclosure, it is possible to adjust the step of the exterior component only by adjusting the height of the inner bolt 200 since the exterior component is fixed by assembling the inner bolt 200 or the assembly bolt 300 to the weld nut 100 fixed on the vehicle body.

As is apparent from the above description, the present disclosure can obtain the following effects by the configuration, combination, and relationship of the components described in the exemplary embodiments.

In embodiments of the present disclosure, it is possible to adjust the step of the exterior component only by adjusting the height of the inner bolt since the exterior component is fixed by assembling the inner bolt or the assembly bolt to the weld nut fixed on the vehicle body.

In addition, it is possible to prevent the inner bolt from being loosened from the weld nut since the assembly bolt applies pressure to the inner protrusion formed on the inner bolt as the assembly bolt is inserted into the inner bolt.

The above detailed description is illustrative of the disclosure. In addition, the above description is intended to illustrate and explain the preferred embodiments of the present disclosure, and the present disclosure may be used in various other combinations, modifications, and environments. That is, it is possible to make changes or modifications within the scope of the concept of the disclosure disclosed herein, within the scope of the disclosure, and/or within the skill and knowledge of the art. The described embodiments are intended to illustrate the best mode for carrying out the technical idea of the present disclosure and various changes may be made in the specific applications and uses of the present disclosure. Accordingly, the detailed description of the disclosure is not intended to limit the disclosure to the disclosed embodiments. It is also to be understood that the appended claims are intended to cover such other embodiments.

What is claimed is:

1. A structure for fastening vehicle components with adjustable steps, the structure comprising:
   a weld nut configured to be fixed to a vehicle floor panel;
   an inner bolt positioned above and fixedly inserted into the weld nut; and
   an assembly bolt inserted through the inner bolt and fastened to one end of the weld nut, wherein the inner bolt is configured to move in a height direction for step adjustment, and
   wherein the inner bolt comprises an inner bolt fastening part formed at an end of an inner bolt stopper,
   wherein the inner bolt fastening part comprises a through-hole into which the assembly bolt is inserted,
   wherein the inner bolt fastening part comprises a plurality of slits formed in the height direction and an inner protrusion formed at one end of the through-hole; and
   the assembly bolt is configured to push the inner protrusion outward while being inserted into the through-hole, and the inner bolt fastening part is configured to be expanded with respect to the slits to be compressed to the weld nut.

2. The structure of claim 1, wherein the weld nut comprises:
   a weld nut stopper exposed to an upper surface of the vehicle floor panel; and
   a weld nut fastening part formed at an end of the weld nut stopper.

3. The structure of claim 2, wherein the inner bolt comprises:
   the inner bolt stopper formed above the weld nut stopper.

4. The structure of claim 3, wherein:
   a first end of the assembly bolt is inserted through the through-hole is adjacent to the inner bolt stopper and a second end of the assembly bolt is fastened to the weld nut.

5. The structure of claim 2, wherein the weld nut fastening part comprises:
   a reverse thread formed at its upper end for insertion of the inner bolt; and
   a forward thread formed at its lower end for engagement with the assembly bolt.

6. The structure of claim 5, wherein after one end of the assembly bolt is engaged to the forward thread, the inner bolt is configured to move in the height direction along the reverse thread.

7. The structure of claim 1, wherein the inner bolt allows for the step adjustment according to its amount of rotation.

8. A vehicle comprising:
   a vehicle body including a vehicle floor panel;
   a weld nut fixed to the vehicle floor panel;
   an inner bolt positioned above and fixedly inserted into the weld nut; and
   an assembly bolt inserted through the inner bolt and fastened to one end of the weld nut, wherein the inner bolt is configured to move in a height direction for step adjustment,
   wherein the inner bolt comprises an inner bolt fastening part formed at an end of an inner bolt stopper,
   wherein the inner bolt fastening part comprises a through-hole into which the assembly bolt is inserted,
   wherein the inner bolt fastening part comprises a plurality of slits formed in the height direction and an inner protrusion formed at one end of the through-hole, and
   wherein the assembly bolt is configured to push the inner protrusion outward while being inserted into the through-hole, and the inner bolt fastening part is configured to be expanded with respect to the slits to be compressed to the weld nut.

9. The vehicle of claim 8, wherein the weld nut comprises:
   a weld nut stopper exposed to an upper surface of the vehicle floor panel; and
   a weld nut fastening part formed at an end of the weld nut stopper.

10. The vehicle of claim 9, wherein the inner bolt comprises:
    the inner bolt stopper formed above the weld nut stopper.

11. The vehicle of claim 10, wherein:
    a first end of the assembly bolt inserted through the through-hole is adjacent to the inner bolt stopper and a second end of the assembly bolt thereof is fastened to the weld nut.

12. The vehicle of claim 9, wherein the weld nut fastening part comprises:
    a reverse thread formed at its upper end for insertion of the inner bolt; and
    a forward thread formed at its lower end for engagement with the assembly bolt.

13. The vehicle of claim 12, wherein after one end of the assembly bolt is engaged to the forward thread, the inner bolt is configured to move in the height direction along the reverse thread.

14. The vehicle of claim 8, wherein the inner bolt allows for the step adjustment according to its amount of rotation.

15. A fastening structure comprising:

a weld nut fixed to a vehicle panel, the weld nut comprising a weld nut stopper exposed to an upper surface of the vehicle panel and a weld nut fastening part formed at an end of the weld nut stopper;

an inner bolt positioned above and fixedly inserted into the weld nut; and an assembly bolt inserted through the inner bolt and fastened to one end of the weld nut;

wherein the inner bolt is configured to move in a height direction for step adjustment; and wherein the step adjustment is determined by an amount of rotation of the inner bolt, wherein the inner bolt comprises an inner bolt fastening part formed at an end of an inner bolt stopper, wherein the inner bolt fastening part comprises a through-hole into which the assembly bolt is inserted;

wherein one end of the assembly bolt inserted through the through-hole is adjacent to the inner bolt stopper, and the other end thereof is fastened to the weld nut;

wherein the inner bolt fastening part comprises at least two slits formed in the height direction and an inner protrusion formed at one end of the through-hole; and wherein the assembly bolt is configured to push the inner protrusion outward while being inserted into the through-hole, and the inner bolt fastening part is configured to be expanded with respect to the slits to be compressed to the weld nut.

16. The fastening structure of claim 15, wherein the inner bolt comprises:

the inner bolt stopper formed above the weld nut stopper.

17. The fastening structure of claim 15, wherein the weld nut fastening part comprises:

a reverse thread formed at its upper end for insertion of the inner bolt; and a forward thread formed at its lower end for engagement with the assembly bolt, wherein after one end of the assembly bolt is engaged to the forward thread, the inner bolt is configured to move in the height direction along the reverse thread.

\* \* \* \* \*